US011021903B2

(12) United States Patent
Goto et al.

(10) Patent No.: US 11,021,903 B2
(45) Date of Patent: Jun. 1, 2021

(54) VEHICLE DOOR OPENING AND CLOSING APPARATUS

(71) Applicant: AISIN SEIKI KABUSHIKI KAISHA, Kariya (JP)

(72) Inventors: Satoru Goto, Toyota (JP); Takayuki Sengoku, Nagoya (JP); Takeshi Yamamoto, Takahama (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 303 days.

(21) Appl. No.: 16/272,046

(22) Filed: Feb. 11, 2019

(65) Prior Publication Data

US 2019/0284861 A1    Sep. 19, 2019

(30) Foreign Application Priority Data

Mar. 13, 2018  (JP) .............................. JP2018-045363

(51) Int. Cl.
*E05F 15/622* (2015.01)
*F16H 25/20* (2006.01)
*B60J 5/10* (2006.01)

(52) U.S. Cl.
CPC ............. *E05F 15/622* (2015.01); *B60J 5/106* (2013.01); *F16H 25/20* (2013.01); *E05Y 2900/546* (2013.01); *F16H 2025/204* (2013.01); *F16H 2025/2031* (2013.01); *F16H 2025/2043* (2013.01); *F16H 2025/2075* (2013.01)

(58) Field of Classification Search
None
See application file for complete search history.

(56) References Cited

U.S. PATENT DOCUMENTS

| 10,119,599 | B2 | 11/2018 | Fischer et al. |
| 10,883,580 | B2* | 1/2021 | Kuster .................... F16H 25/24 |
| 2010/0107790 | A1* | 5/2010 | Yamaguchi ............. F16H 25/20 |
| | | | 74/89.38 |
| 2010/0139427 | A1* | 6/2010 | Yamaguchi ............. F16H 25/20 |
| | | | 74/89.33 |

(Continued)

FOREIGN PATENT DOCUMENTS

JP          2016-513778          5/2016

*Primary Examiner* — William Kelleher
*Assistant Examiner* — Gregory T Prather
(74) *Attorney, Agent, or Firm* — Oblon, McClelland, Maier & Neustadt, L.L.P.

(57) ABSTRACT

A supporting member includes: a rotatable spindle supported in a first housing; a cylindrical first guide fixed in a second housing, and guiding a relative movement of the spindle in an axial direction; a second guide fixed in the first housing, having an inner diameter larger than a first guide's outer diameter, and relatively movable in the direction to the first guide; and a nut being a stepped shaft-like member including an insertion portion inserted into the first guide, a protruding portion protruded from the first guide, and a narrow portion provided therebetween. The first guide includes a caulking portion to the nut at an opening end. The caulking portion includes a portion extending to intersect in the direction along a step between the insertion portion and the narrow portion, and another portion parallel to the direction along an outer circumferential surface of the narrow portion.

7 Claims, 9 Drawing Sheets

(56) References Cited

U.S. PATENT DOCUMENTS

| | | | |
|---|---|---|---|
| 2014/0157918 A1* | 6/2014 | Ikeda | F16H 25/2204 74/89.23 |
| 2014/0157919 A1* | 6/2014 | Kondo | F16H 25/2204 74/89.23 |
| 2016/0153532 A1 | 6/2016 | Fischer et al. | |
| 2017/0089113 A1* | 3/2017 | Katsuyama | E05F 15/00 |
| 2017/0362876 A1* | 12/2017 | Ishikawa | H02K 5/14 |
| 2018/0112751 A1* | 4/2018 | Kuster | F16H 25/08 |
| 2019/0277076 A1* | 9/2019 | Takizawa | H02K 5/10 |
| 2019/0346028 A1* | 11/2019 | Ohkawa | F16H 25/20 |
| 2020/0002992 A1* | 1/2020 | Sekine | F16H 25/20 |
| 2020/0339090 A1* | 10/2020 | Boehm | B60T 13/161 |

* cited by examiner

VEHICLE DOOR OPENING AND CLOSING APPARATUS

CROSS REFERENCE TO RELATED APPLICATIONS

This application is based on and claims priority under 35 U.S.C. § 119 to Japanese Patent Application 2018-045363, filed on Mar. 13, 2018, the entire content of which is incorporated herein by reference.

TECHNICAL FIELD

This disclosure generally relates to a vehicle door opening and closing apparatus.

BACKGROUND DISCUSSION

As such a vehicle door opening and closing apparatus, there has hitherto been proposed an apparatus that includes a supporting member for supporting a door to be opened and closed according to expansion and contraction (for example, see JP2016-513778A (Reference 1)). The supporting member described in Reference 1 includes a first housing and a second housing that have a cylindrical shape and are arranged so as to be relatively movable in an axial direction, a spindle supported rotatably in the first housing, a motor configured to rotationally drive the spindle, a cylindrical spindle nut tube, coaxially fixed in the second housing, into which the spindle is inserted, a cylindrical guide tube, coaxially fixed in the first housing, into which the spindle nut tube is inserted, and a nut, attached to the spindle nut tube so as to protrude from an end portion of the spindle nut tube, an inner circumferential surface of the nut being screwed to the spindle. The supporting member relatively non-rotatably engages the spindle nut tube with the guide tube by engagement of a convex portion on an inner circumferential surface of the guide tube and a concave portion on an outer circumferential surface of a protruding portion of the nut, which allows transmission of torque from the motor to expand and contract the first housing and the second housing.

In the above-mentioned supporting member, insert molding is employed for fixing the nut to an opening end portion of the spindle nut tube. Therefore, in some cases, production costs are increased due to using of a plurality of molds, and setting appropriate molding conditions such as a molding injection pressure, an injection speed, and a temperature is difficult. Meanwhile, it is also conceivable that the nut is caulk-fixed to the opening end portion of the spindle nut tube. In a case of caulk-fixing the nut, it is desirable, for preventing falling-off, breakage, and the like of the nut, to not only form the caulking portion with an appropriate shape, but also enable a check of a dimension of the caulking portion to be easier.

A need thus exists for a vehicle door opening and closing apparatus which is not susceptible to the drawback mentioned above.

SUMMARY

A vehicle door opening and closing apparatus according to this disclosure takes the following measures in order to achieve the above-mentioned main purpose.

A vehicle door opening and closing apparatus according to this disclosure includes a supporting member interposed between a vehicle body and a door, and configured to support the door to be openable and closable according to expansion and contraction. The supporting member includes: a first housing and a second housing, a spindle, a first guide, a second guide, and a nut. The first housing and the second housing have a cylindrical shape and are arranged so as to be relatively movable in an axial direction. The spindle is supported in the first housing and is configured to rotate by driving of a motor. The first guide has a cylindrical shape and is fixed in the second housing and configured to guide a relative movement of the spindle in an axial direction. The second guide is fixed in the first housing, has an inner diameter larger than an outer diameter of the first guide, and is configured to be relatively movable in an axial direction with respect to the first guide. The nut is a stepped shaft-like member including an insertion portion configured to be inserted into the first guide, a protruding portion protruded from the first guide, and a narrow portion between the insertion portion and the protruding portion. The nut is screwed to the spindle on an inner circumferential surface and fixed to the first guide so as to be connected at the protruding portion to be relatively movable in an axial direction with respect to the second guide and relatively non-rotatable with respect to the second guide. The first guide includes a caulking portion with respect to the nut at an opening end. The caulking portion includes a first extended portion extending so as to intersect in an axial direction along a step between the insertion portion and the narrow portion, and a second extended portion extending parallel to an axial direction along an outer circumferential surface of the narrow portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained with reference to the attached drawings.

Modes for carrying out this disclosure will be explained with reference to the embodiment.

Embodiment

Figure 1:
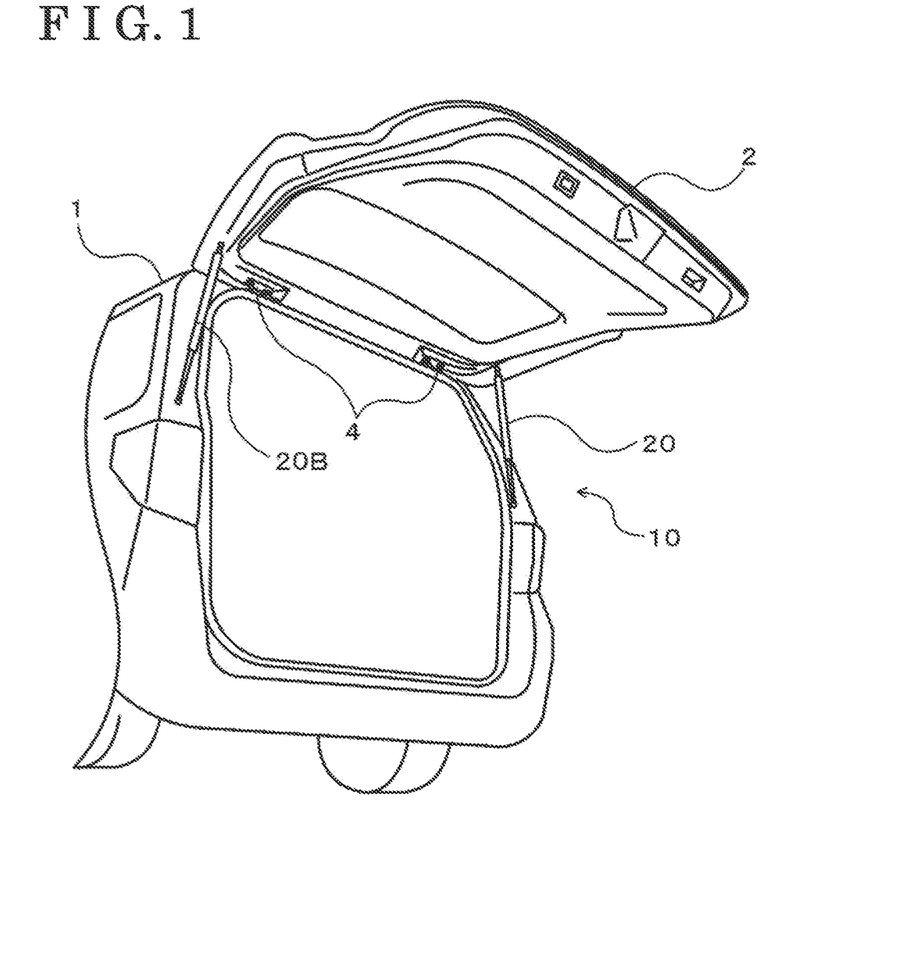
FIG. 1 is an exterior diagram illustrating an appearance of a vehicle door opening and closing apparatus 10.
Figure 2:
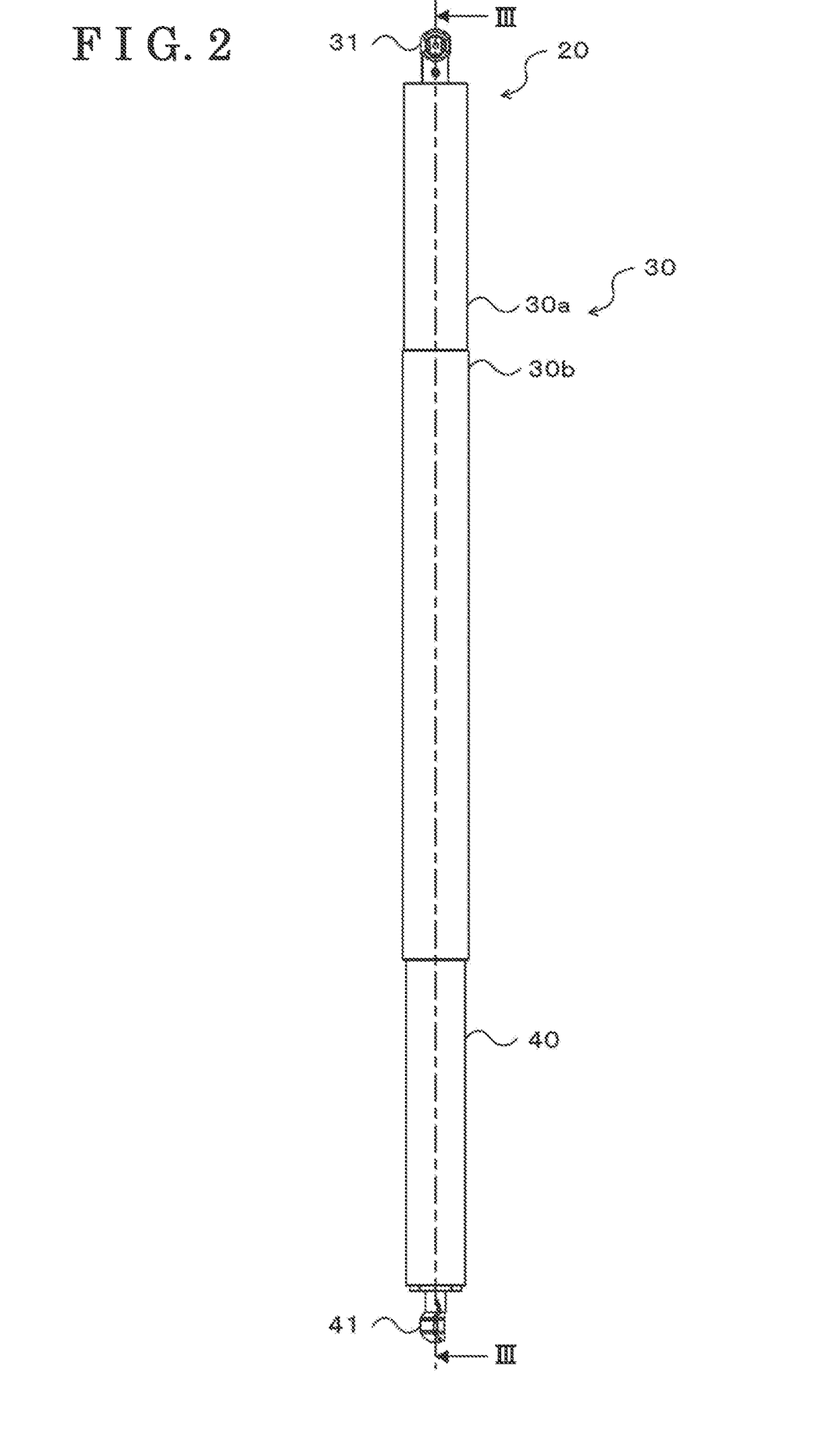
FIG. 2 is an exterior diagram illustrating an appearance of a supporting member 20.
Figure 3:
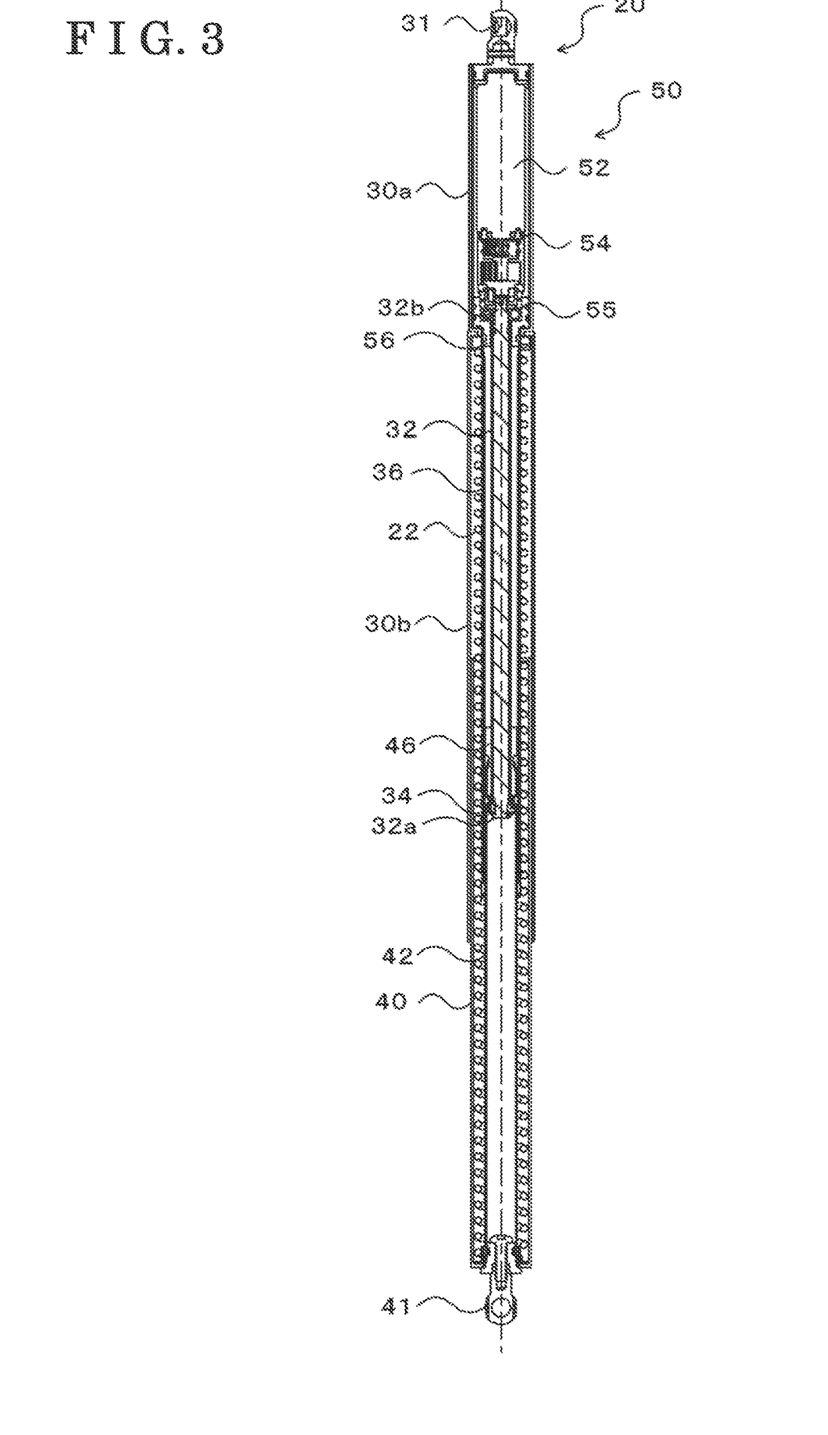
FIG. 3 is a configuration diagram illustrating a configuration of the supporting member 20.
Figure 4:
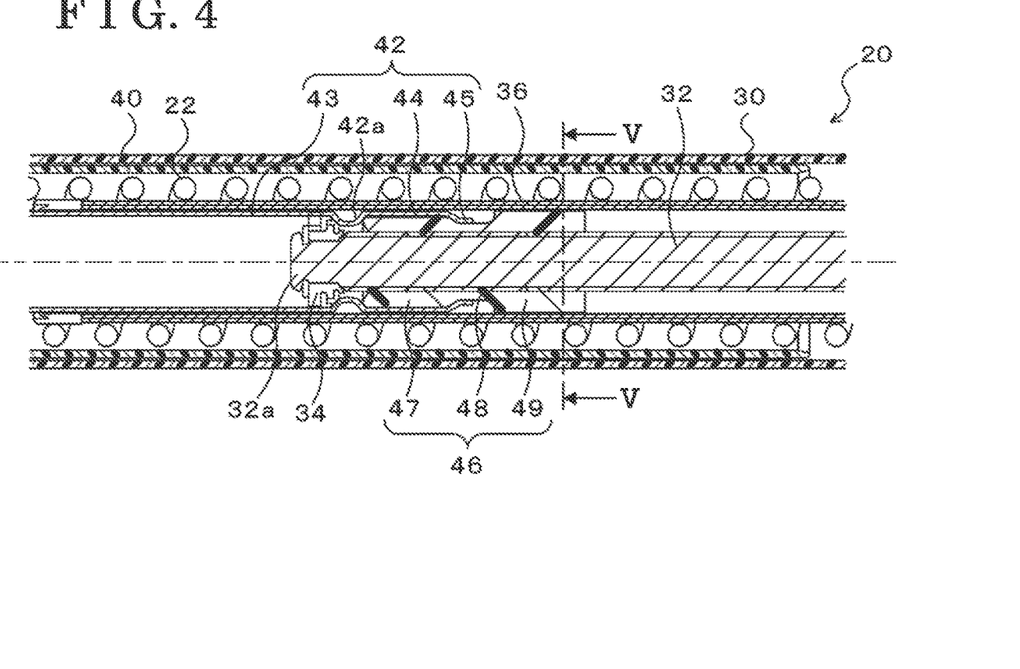
FIG. 4 is a configuration diagram illustrating a part of the supporting member 20 in an enlarged manner.
Figure 5:
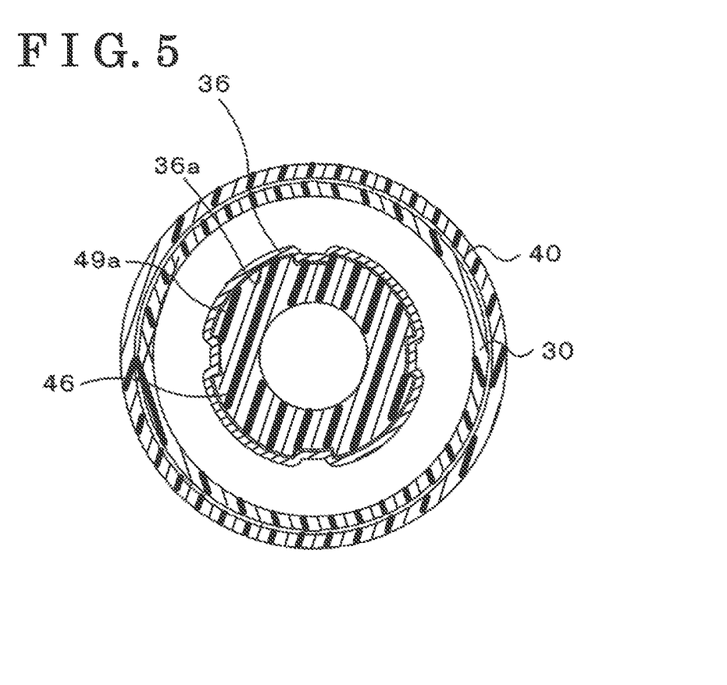
FIG. 5 is a sectional view taken along a line B-B of FIG. 4.

FIG. 1 is an exterior diagram illustrating an appearance of a vehicle door opening and closing apparatus 10, FIG. 2 is an exterior diagram illustrating an appearance of a supporting member 20, FIG. 3 is a configuration diagram illustrating a configuration of the supporting member 20, FIG. 4 is a configuration diagram illustrating a part of the supporting member 20 in an enlarged manner, and FIG. 5 is a sectional view taken along a line B-B of FIG. 4. Note that FIG. 3 is a sectional view taken along a line A-A of FIG. 2.

As illustrated in FIG. 1, the vehicle door opening and closing apparatus 10 according to the embodiment includes two supporting members 20 and 20B interposed between a vehicle body 1 and a door 2. The vehicle door opening and closing apparatus 10 is configured as a power door device which opens and closes the door 2 by expanding and contracting the supporting member 20 by an actuator embedded in the supporting member 20. In the door 2, in the present embodiment, an upper end portion is attached to a rear portion of the vehicle body 1 via hinges 4, and is configured as a flip-up type back door which is rotatable in an upward-and-downward direction by using the hinges 4 as a fulcrum. The two supporting members 20 and 20B are respectively attached to left and right ends in a vehicle width direction, and support the door 2 at both of the left and right ends. The supporting member 20 is configured to expand and contract by converting a rotational motion of a motor as an actuator into a linear motion. Moreover, the supporting member 20B does not include an actuator, and assists opening and closing of the door 2 by the supporting member 20, and thus the detailed explanation is omitted.

As illustrated in FIGS. 2 to 5, the supporting member 20 includes a first housing 30 made of resin and having a cylindrical shape, a second housing 40 made of resin and having a cylindrical shape, and a spring (compression coil spring) 22 which urges the first housing 30 and the second housing 40 in a direction to be separated from each other. The supporting member 20 expands and contracts by relatively moving in the axial direction in a state where the first housing 30 and the second housing 40 overlap each other. The first housing 30 and the second housing 40 respectively include sockets 31 and 41 to which spheric head portions (not illustrated) of ball studs that are fixed to the vehicle body 1 and the door 2 are fitted. The sockets 31 and 41 and the ball studs constitute a spheric joint, and flexibly connect both end portions of the supporting member 20 (the first housing 30 and the second housing 40) to the vehicle body 1 and the door 2. Note that the first housing 30 includes a base end side housing 30a having the socket 31 at an end portion, and a tip end side housing 30b into which the second housing 40 is inserted at an opening end so as to be relatively movable. The base end side housing 30a and the tip end side housing 30b are integrally configured.

The supporting member 20 includes a spindle 32 with a spiral groove formed substantially across the entire region in the axial direction, and a driving unit 50 which rotationally drives the spindle 32 is housed in the base end side housing 30a of the first housing 30. On a tip end portion 32a of the spindle 32 (end portion of the second housing 40 side), an annular stopper 34 which protrudes radially outward from an outer circumferential surface is disposed. Moreover, a base end portion 32b of the spindle 32 (end portion of the driving unit 50 side) is rotatably supported by a bearing 55 of the driving unit 50.

The driving unit 50 includes a motor 52, a deceleration gear (planetary gear) 54 which reduces a rotational speed of the motor 52 and then transmits the rotation to the spindle 32, and a fixing member 56 being formed with a center hole for allowing the base end portion 32b of the spindle 32 to be inserted thereinto, having the bearing 55 arranged on an inner circumferential surface, and being fixed in the base end side housing 30a. The motor 52 is configured as a permanent magnet synchronous motor including a rotor to which a permanent magnet is attached, and a stator on which a three-phase coil is wound. The fixing member 56 is a stepped cylindrical member including a large diameter portion to be fixed to an opening end portion of the base end side housing 30a, and a small diameter portion, having an outer diameter smaller than the large diameter portion, and protruding in the tip end side housing 30b.

Moreover, as illustrated in FIGS. 3 and 4, the supporting member 20 includes a spindle guide 42 and a slide guide 36 which are made of metal formed in a cylindrical shape. The spindle guide 42, whose inner diameter is formed larger than an outer diameter of the spindle 32, opens one end side, and coaxially fixes the other end side to the second housing 40. The spindle guide 42, into which the tip end portion 32a of the spindle 32 is inserted from an opening end, guides a relative movement of the spindle 32 in an axial direction. A spindle nut 46 screwed to the spindle 32 is caulk-fixed to an inner circumferential surface of the opening end of the spindle guide 42. The slide guide 36, whose inner diameter is formed slightly larger than an outer diameter of the spindle guide 42, is coaxially fixed to the first housing 30 by opening one end side and fixing the other end side to the fixing member 56 (small diameter portion). The slide guide 36, into which an opening end portion of the spindle guide 42 is inserted from an opening end, guides a relative movement in an axial direction.

Figure 6:
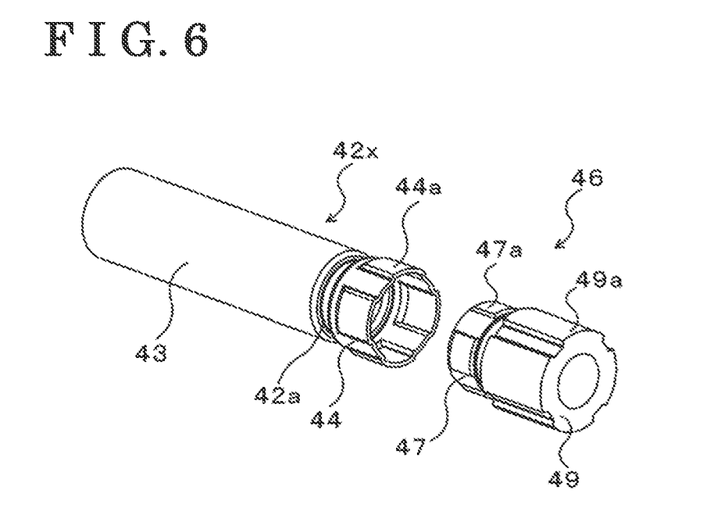
FIG. 6 is a perspective view illustrating an appearance of a spindle nut 46 and a spindle guide 42x before caulking.
Figure 7:
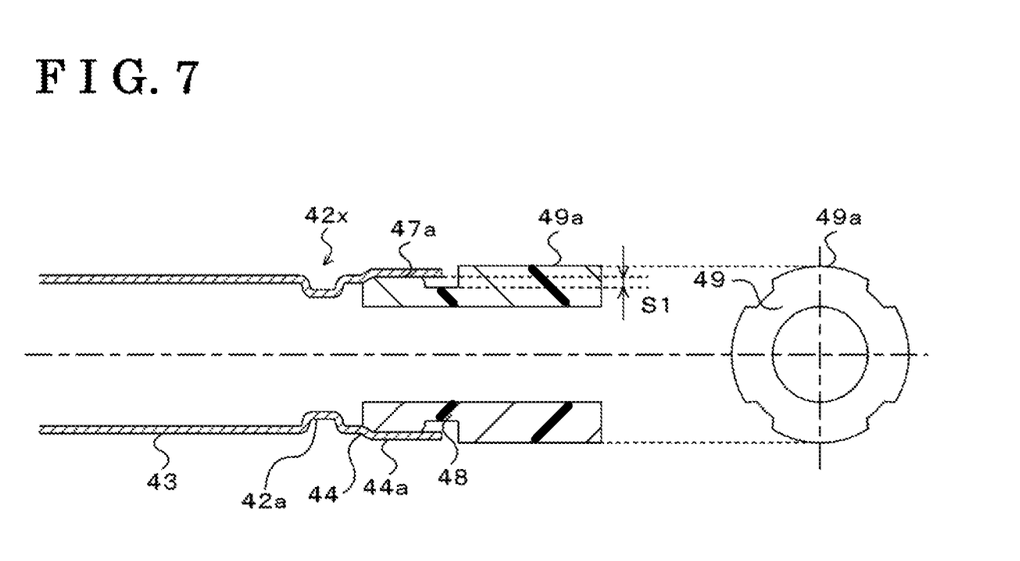
FIG. 7 is an explanatory diagram illustrating an amount of caulking.
Figure 8:
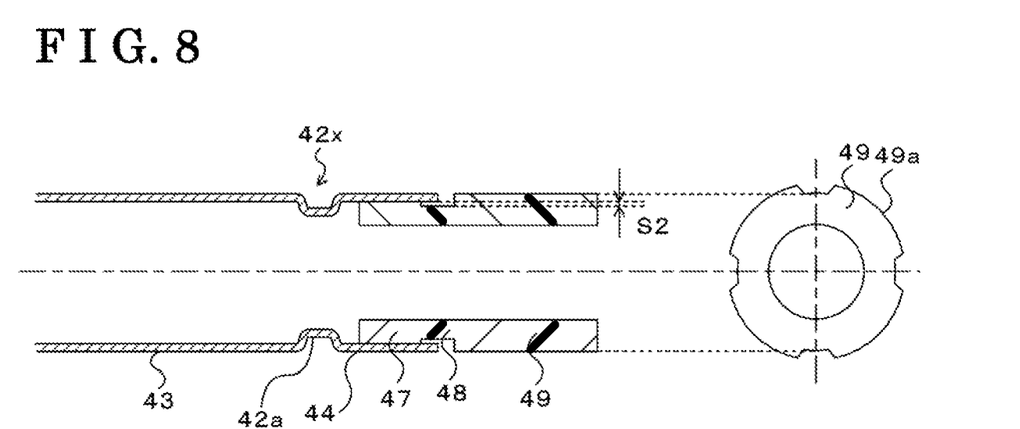
FIG. 8 is an explanatory diagram illustrating an amount of caulking.
Figure 9:
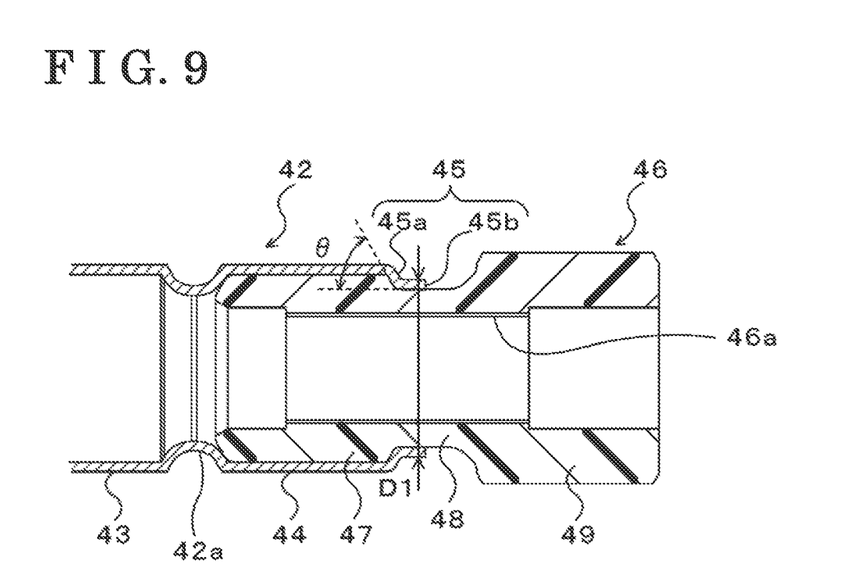
FIG. 9 is an explanatory diagram illustrating a shape of a caulking portion 45 according to an embodiment.

Herein, FIG. 6 is a perspective view illustrating an appearance of the spindle nut 46 and a spindle guide 42x before caulking, and FIGS. 7 and 8 are explanatory diagrams illustrating an amount of caulking. Moreover, FIG. 9 is an explanatory diagram illustrating a shape of a caulking portion 45 according to the embodiment. FIGS. 6 to 8 are diagrams before caulking the spindle nut 46, and indicate the spindle guide 42 before caulking as the spindle guide 42x. As illustrated in the drawings, the spindle guide 42x includes a first cylindrical portion 43 formed with a predetermined outer diameter, and a second cylindrical portion 44, having the same outer diameter as that of the first cylindrical portion 43, to which a plurality of (herein, four) concave portions 44a recessed toward the outer diameter side are formed in a circumferential direction at equal intervals. Between the first cylindrical portion 43 and the second cylindrical portion 44, a recess portion 42a recessed toward the inner diameter side over the entire periphery in the circumferential direction for axially aligning the spindle nut 46 is formed. The second cylindrical portion 44 is caulked in a state where the spindle nut 46 is inserted (see FIGS. 7 and 8), thereby forming the caulking portion 45 to which the spindle nut 46 is caulk-fixed on an opening end side. In other words, the caulking portion 45 with respect to the spindle nut 46 is disposed.

The spindle nut 46 is a stepped shaft-like member made of resin, and includes an insertion portion 47 inserted into the spindle guide 42, a protruding portion 49 formed with an outer diameter larger than that of the insertion portion 47 and protruding from the spindle guide 42, and a narrow portion 48 between the insertion portion 47 and the protruding portion 49. The spindle nut 46 includes a screwing portion 46a screwed to the spindle 32 on an inner circumferential surface (see FIG. 10). Therefore, the spindle 32 and the spindle nut 46 constitute a rotational-linear motion converting mechanism which converts a relative rotational motion and a linear motion to each other. The screwing portion 46a is formed substantially in the center in an axial direction of the spindle nut 46 and is positioned at a location overlapped radially with the narrow portion 48. Since an inner diameter of the spindle nut 46 is large at a location where the screwing portion 46a is not formed, the screwing portion 46a and the narrow portion 48 are overlapped radially, which makes it possible to ensure a thickness of the narrow portion 48.

Moreover, in the spindle nut 46, a plurality of (herein, four) convex portions 47a fitted in the concave portions 44a of the second cylindrical portion 44 of the spindle guide 42 are formed on an outer circumferential surface of the insertion portion 47 in a circumferential direction at equal intervals. The spindle nut 46 allows the insertion portion 47 to be inserted into the spindle guide 42 in such a way that the convex portions 47a are fitted into the concave portions 44a, thereby engaging the spindle nut 46 and the spindle guide 42 relatively non-rotatably. Moreover, the spindle nut 46 includes a plurality of (herein, four) convex portions 49a formed on an outer circumferential surface of the protruding portion 49 in a circumferential direction at equal intervals. As illustrated in FIG. 5, in the slide guide 36, a plurality of (herein, four) concave portions 36a are formed in the circumferential direction at equal intervals, and the convex portions 49a are fitted in the concave portions 36a of the slide guide 36, and thereby the spindle nut 46 and the slide guide 36 are engaged relatively non-rotatably. Herein, at a step between the insertion portion 47 and the narrow portion 48, there are formed a location with a relatively large step S1 because the convex portions 47a are formed on the outer circumferential surface (see FIG. 7) and a location with a relatively small step S2 because the convex portions 47a are not formed (see FIG. 8). Therefore, the location where the concave portions 44a of the second cylindrical portion 44 are formed is caulked with an amount of caulking corresponding to the step S1, which allows for ensuring a sufficient amount of caulking, and preventing the spindle nut 46 from coming off easily in the axial direction.

Moreover, as illustrated in FIG. 9, the caulking portion 45 includes a first extended portion 45a configured to extend so as to incline (intersect) with respect to the axial direction along a step (herein, inclined surface) between the insertion portion 47 of the spindle nut 46 and the narrow portion 48, and a second extended portion 45b configured to extend parallel to the axial direction along an outer circumferential surface of the narrow portion 48. In other words, the first extended portion 45a is formed in a tapered shape, and the second extended portion 45b is formed in an annular shape having a constant outer diameter. The spindle guide 42 can reliably maintain the step between the insertion portion 47 and the narrow portion 48 by the first extended portion 45a, which makes it possible to prevent the spindle nut 46 from coming off easily in the axial direction. Note that an angle θ with respect to an axial direction of the first extended portion 45a is set to 60 degrees in the present embodiment. Moreover, the spindle guide 42 can suppress expansion of an opening end by the second extended portion 45b, which makes it possible to prevent the spindle nut 46 from coming off easily in the axial direction. Further, it is possible to easily check whether or not caulking is performed in accordance with design by measuring an outer diameter D1 of the second extended portion 45b. In other words, dimensional control of the caulking portion 45 can be easily performed.

Figure 10:
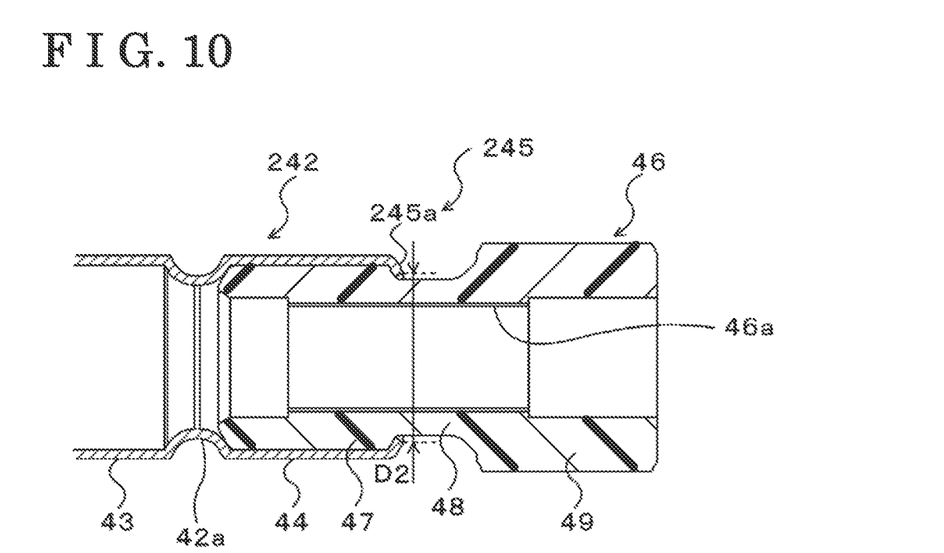
FIG. 10 is an explanatory diagram illustrating a shape of a caulking portion 245 according to a comparative example.

Herein, FIG. 10 is an explanatory diagram illustrating a shape of a caulking portion 245 according to a comparative example. As illustrated in FIG. 10, the caulking portion 245 according to the comparative example does not include the second extended portion 45b, but includes a first extended portion 245a corresponding to the first extended portion 45a. This reduces an effect of preventing the spindle nut 46 from coming off toward the axial direction in comparison with the embodiment. Moreover, dimensional control of the caulking portion 245 is performed by measuring an outer diameter D2 of a tip end of the first extended portion 245a, thereby making dimensional control difficult in comparison with the embodiment. In order to overcome the reduction of the coming-off prevention effect and the difficulty of the dimensional control, the caulking portion 45 according to the present embodiment includes the first extended portion 45a and the second extended portion 45b.

As mentioned above, in the vehicle door opening and closing apparatus 10 with this configuration, the spindle 32 and the spindle nut 46 constitute the rotational-linear motion converting mechanism. Moreover, since the spindle 32 is supported rotatably in the first housing 30, the spindle guide 42 is coaxially fixed to the second housing 40, and the slide guide 36 is coaxially fixed to the first housing 30, the first housing 30 and the second housing 40 relatively move in the axial direction by relatively moving the slide guide 36 and the spindle guide 42 in the axial direction with a relative movement in the axial direction of the spindle 32 and the spindle guide 42. In other words, the supporting member 20 expands and contracts.

Moreover, in the vehicle door opening and closing apparatus 10, opening and closing of the door 2 can be performed by driving the driving unit 50 (motor 52) or by a manual operation of an operator. In a case of opening and closing the door 2 by driving the driving unit 50, opening of the door 2 is performed by rotationally driving the motor 52 in a first direction (normal rotational direction). When the motor 52 is rotationally driven in the first direction, torque from the motor 52 is amplified by the deceleration gear 54 and transmitted to the spindle 32, and then rotates the spindle 32 in the first direction. When the spindle 32 rotates in the first direction, rotational motion of the spindle 32 is converted via the spindle nut 46 to linear motion of the slide guide 36 and the spindle nut 46 in a direction of expanding the supporting member 20. Accordingly, the supporting member 20 expands and opens the door 2. Meanwhile, closing of the door 2 is performed by rotationally driving the motor 52 in a second direction (reverse rotational direction). When the motor 52 is rotationally driven in the second direction, torque from the motor 52 is amplified by the deceleration gear 54 and transmitted to the spindle 32, and then rotates the spindle 32 in the second direction. When the spindle 32 rotates in the second direction, rotational motion of the spindle 32 is converted via the spindle nut 46 to linear motion of the slide guide 36 and the spindle nut 46 in a direction of contracting the supporting member 20. Accordingly, the supporting member 20 contracts and closes the door 2.

According to the vehicle door opening and closing apparatus 10 described above, the spindle guide 42 includes the caulking portion 45 to which the spindle nut 46 is caulk-fixed, at the opening end, and the caulking portion 45 includes the first extended portion 45a configured to extend so as to intersect with respect to the axial direction along the step between the insertion portion 47 and the narrow portion 48, and the second extended portion 45b configured to extend parallel to the axial direction along the outer circumferential surface of the narrow portion 48. Therefore, the first extended portion 45a maintains the step between the insertion portion 47 and the narrow portion 48, and the second extended portion 45b can suppress expansion of the tip end of the caulking portion 45, which makes it possible to prevent falling-off of the spindle nut 46. Moreover, measuring external dimensions of the second extended portion 45b allows a caulking amount to be checked easily and control of the caulking shape to be facilitated. Therefore, by making a shape of the caulking portion 45 more appropriate, the spindle nut 46 can be fixed reliably.

Moreover, the spindle nut 46 is disposed on a location where the screwing portion 46a on the inner circumferential surface screwed to the spindle 32 radially overlaps with the narrow portion 48, which makes it possible to ensure the thickness of the narrow portion 48 and prevent breakage or the like of the spindle nut 46 at the time of caulking.

Moreover, since the first housing 30 and the second housing 40 are made of resin, the spindle guide 42 and the slide guide 36 are made of metal, and the spindle nut 46 is made of resin, the entire weight of the supporting member 20 can be suppressed, which makes it possible to make a shape of the caulking portion 45 more appropriate, fix the spindle nut 46 reliably, and reduce the weight.

Figure 11:
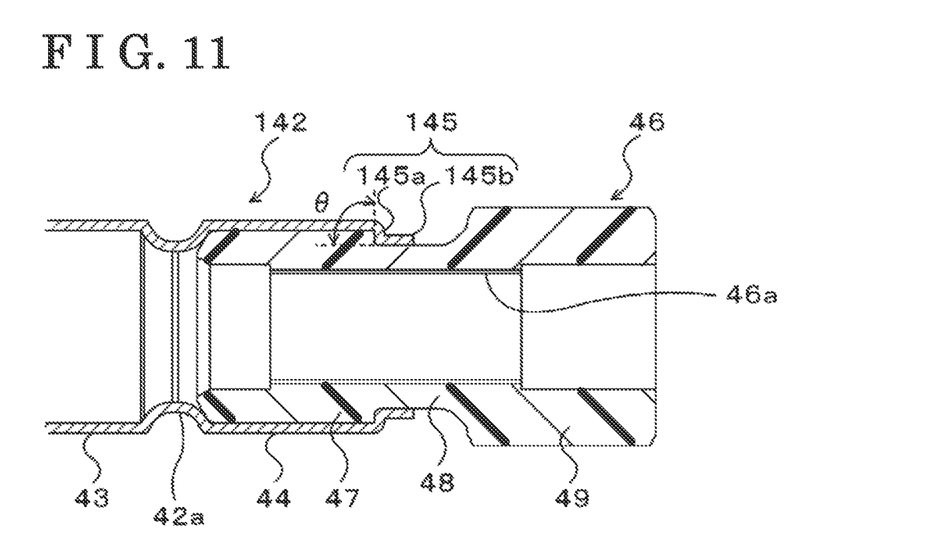
FIG. 11 is an explanatory diagram illustrating a shape of a caulking portion 145 according to a modification example.

In the embodiment, in the caulking portion 45, a case where an angle θ of the first extended portion 45a with respect to the axial direction is 60 degrees has been exemplified, but the disclosure is not limited to this example. The angle θ of the first extended portion 45a with respect to the axial direction may be preferably at an angle from 45 degrees to 90 degrees, more preferably at an angle from 60 degrees to 90 degrees, and further preferably at an angle from 75 degrees to 90 degrees. FIG. 11 is an explanatory diagram illustrating a shape of a caulking portion 145 according to a modification example. As illustrated in FIG. 11, an angle θ of a first extended portion 145a with respect to the axial direction is 90 degrees (substantially right angle), and a second extended portion 145b extends along an outer circumferential surface of the narrow portion 48 in a similar manner to the second extended portion 45b according to the embodiment. This allows the first extended portion 145a to hold the step between the insertion portion 47 and the narrow portion 48 more reliably. Moreover, it is possible to enhance an effect of suppressing expansion of the tip end of the caulking portion 45 by making the second extended portion 145b slightly longer than the second extended portion 45b. From above, it is possible to further prevent falling-off of the spindle nut 46.

In the embodiment, the screwing portion 46a on the inner circumferential surface of the spindle nut 46 is disposed on a location that radially overlaps with the narrow portion 48, but the disclosure is not limited to this example. The screwing portion 46a may be disposed on a location that does not radially overlap with the narrow portion 48.

Figure 12:
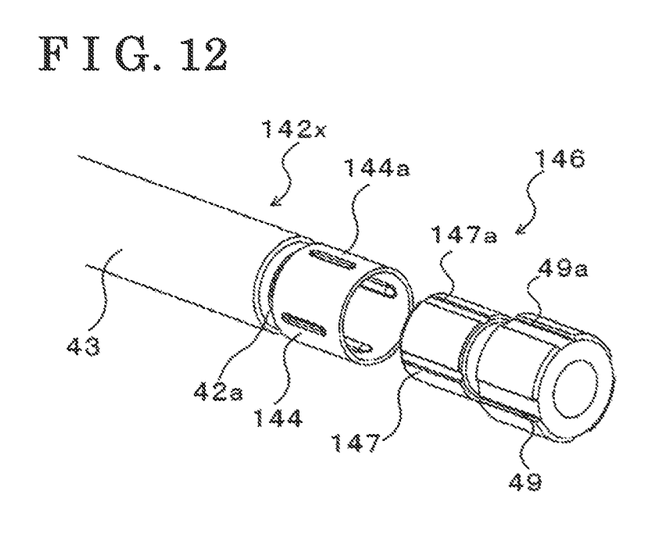
FIG. 12 is a perspective view illustrating an appearance of a spindle nut 146 and a spindle guide 142x according to the modification example.

As illustrated in FIG. 6, in the embodiment, the spindle guide 42x before caulking includes the second cylindrical portion 44, having the same outer diameter as that of the first cylindrical portion 43, to which the plurality of concave portions 44a recessed outward on the inner circumferential surface are formed in the circumferential direction at equal intervals. In other words, a sectional shape of the second cylindrical portion 44 is based on a circular shape with a concave and convex portion, thereby increasing an engagement allowance with the insertion portion 47 of the spindle nut 46 in the circumferential direction and improving rotation preventing intensity. However, the disclosure is not limited to this shape. For example, as illustrated in the modification example in FIG. 12, a second cylindrical portion 144 of a spindle guide 142x before caulking may be formed with a plurality of projecting portions 144a which project inward in a form of a streak on an inner circumferential surface in a circumferential direction at equal intervals, and a plurality of grooves 147a capable of fitting to the projecting portions 144a may be formed in an insertion portion 147 of a spindle nut 146 in the circumferential direction at equal intervals. For example, in a case of a use environment in which rotation preventing intensity can be ensured, molding can be easily made by making a sectional shape of the second cylindrical portion 144 being a substantially circular shape in this manner.

In the embodiment, the first housing 30, the second housing 40, and the spindle nut 46 are made of resin, and the spindle guide 42 and the slide guide 36 are made of metal, but the disclosure is not limited to this example. For example, metal-made members may be employed instead of resin-made members.

In the embodiment, the two supporting members 20 and 20B which support the door 2 to be opened and closed are provided, but the number of supporting members may be one, or may be three or more.

In the embodiment, the vehicle door opening and closing apparatus according to this disclosure is employed in opening and closing the back door provided in a rear portion of the vehicle body 1, but may be employed in opening and closing other vehicle doors.

Description will be given of the correspondence relationship between the main elements of the embodiment and the main elements of the disclosure described in SUMMARY. In the embodiment, the supporting member 20 corresponds to "supporting member", the first housing 30 corresponds to "first housing", the second housing 40 corresponds to "second housing", the spindle 32 corresponds to "spindle", the spindle guide 42 corresponds to "first guide", the slide guide 36 corresponds to "second guide", the spindle nut 46 corresponds to "nut", the caulking portion 45 corresponds to "caulking portion", the first extended portion 45a corresponds to "first extended portion", and the second extended portion 45b corresponds to "second extended portion". Moreover, the screwing portion 46a corresponds to "screwing portion".

Note that, since the embodiment is an example for specifically describing a mode for carrying out the disclosure described in SUMMARY, the correspondence relationship between the main elements of the embodiment and the main elements of the disclosure described in SUMMARY does not limit the elements of the disclosure described in SUMMARY. In other words, interpretation of the disclosure described in SUMMARY should be based on the description therein, and the embodiment is merely a specific example of the disclosure described in SUMMARY.

Hereinabove, the mode for carrying out the disclosure has been described by using the embodiment; however, the disclosure is not limited in any manner to the embodiment, and may be carried out in various modes within a scope not departing from the spirit of the disclosure.

This disclosure can be used in the manufacturing industry or the like of the vehicle door opening and closing apparatus.

A vehicle door opening and closing apparatus according to this disclosure includes a supporting member interposed between a vehicle body and a door, and configured to support the door to be openable and closable according to expansion and contraction. The supporting member includes: a first housing and a second housing, a spindle, a first guide, a second guide, and a nut. The first housing and the second housing have a cylindrical shape and are arranged so as to be relatively movable in an axial direction. The spindle is supported in the first housing and is configured to rotate by driving of a motor. The first guide has a cylindrical shape and is fixed in the second housing and configured to guide a relative movement of the spindle in an axial direction. The second guide is fixed in the first housing, has an inner diameter larger than an outer diameter of the first guide, and is configured to be relatively movable in an axial direction with respect to the first guide. The nut is a stepped shaft-like member including an insertion portion configured to be inserted into the first guide, a protruding portion protruded from the first guide, and a narrow portion between the insertion portion and the protruding portion. The nut is screwed to the spindle on an inner circumferential surface and fixed to the first guide so as to be connected at the protruding portion to be relatively movable in an axial direction with respect to the second guide and relatively non-rotatable with respect to the second guide. The first guide includes a caulking portion with respect to the nut at an opening end. The caulking portion includes a first extended portion extending so as to intersect in an axial direction along a step between the insertion portion and the narrow portion, and a second extended portion extending parallel to an axial direction along an outer circumferential surface of the narrow portion.

The vehicle door opening and closing apparatus according to this disclosure includes: a nut that is a stepped shaft-like member including an insertion portion configured to be inserted into a first guide with a cylindrical shape being configured to guide a relative movement of a spindle in an axial direction, a protruding portion protruded from the first guide, and a narrow portion between the insertion portion and the protruding portion, and is screwed to the spindle on an inner circumferential surface and fixed to the first guide so as to be connected to be relatively movable in an axial direction with respect to the second guide and relatively non-rotatable with respect to the second guide. The first guide includes a caulking portion with respect to the nut at an opening end, and the caulking portion includes a first extended portion extending so as to intersect in an axial direction along a step between the insertion portion and the narrow portion, and a second extended portion extending parallel to an axial direction along an outer circumferential surface of the narrow portion.

This allows the first extended portion of the caulking portion to hold the step between the insertion portion and the narrow portion appropriately, and the second extended portion to suppress expansion of a tip end of the caulking portion, which makes it possible to prevent falling-off of the nut. Moreover, a caulking amount can be checked easily by measuring external dimensions of the second extended portion, thereby facilitating control of a caulking shape. Therefore, it is possible to fix the nut reliably by making a shape of the caulking portion more appropriate.

In the vehicle door opening and closing apparatus according to this disclosure, in the caulking portion, the first extended portion may be at an angle ranging from 45 degrees to 90 degrees with respect to an axial direction.

This allows the first extended portion to hold the step between the insertion portion and the narrow portion more reliably, which makes it possible to further prevent falling-off of the nut.

In the vehicle door opening and closing apparatus according to this disclosure, the nut may be disposed on a location where a screwing portion on the inner circumferential surface screwed to the spindle radially overlaps with the narrow portion.

This ensures a thickness of the narrow portion easily, and allows for preventing breakage or the like of the nut.

In the vehicle door opening and closing apparatus according to this disclosure, the first housing and the second housing may be formed of resin in a cylindrical shape, the first guide and the second guide may be formed of metal in a cylindrical shape, and the nut may be formed of resin in a shaft shape.

This allows for making the first housing, the second housing, and the nut with resin, and suppressing weight of the supporting member, which makes it possible to make a shape of the caulking portion more appropriate, fix the nut reliably, and reduce the weight.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle door opening and closing apparatus, comprising:
   a supporting member interposed between a vehicle body and a door, and configured to support the door to be openable and closable according to expansion and contraction,
   the supporting member including
   a first housing and a second housing with a cylindrical shape arranged so as to be relatively movable in an axial direction,
   a spindle supported in the first housing and configured to rotate by driving of a motor,
   a first guide with a cylindrical shape fixed in the second housing and configured to guide a relative movement of the spindle in an axial direction,
   a second guide, fixed in the first housing, having an inner diameter larger than an outer diameter of the first guide, and configured to be relatively movable in an axial direction with respect to the first guide, and
   a nut that is a stepped shaft-like member including an insertion portion configured to be inserted into the first guide, a protruding portion protruded from the first guide, and a narrow portion between the insertion portion and the protruding portion, and is screwed to the spindle on an inner circumferential surface and fixed to the first guide so as to be connected at the protruding portion to be relatively movable in an axial direction with respect to the second guide and relatively non-rotatable with respect to the second guide,
   the first guide including a caulking portion with respect to the nut at an opening end,
   the caulking portion including a first extended portion extending so as to intersect in an axial direction along a step between the insertion portion and the narrow portion, and a second extended portion extending parallel to an axial direction along an outer circumferential surface of the narrow portion.

2. The vehicle door opening and closing apparatus according to claim 1, wherein
   the caulking portion is at an angle ranging from 45 degrees to 90 degrees with respect to an axial direction of the first extended portion.

3. The vehicle door opening and closing apparatus according to claim 2, wherein
   the nut is disposed on a location where a screwing portion on the inner circumferential surface screwed to the spindle radially overlaps with the narrow portion.

4. The vehicle door opening and closing apparatus according to claim 2, wherein
   the first housing and the second housing are formed of resin in a cylindrical shape, the first guide and the second guide are formed of metal in a cylindrical shape, and the nut is formed of resin in a shaft shape.

5. The vehicle door opening and closing apparatus according to claim 1, wherein
   the nut is disposed on a location where a screwing portion on the inner circumferential surface screwed to the spindle radially overlaps with the narrow portion.

6. The vehicle door opening and closing apparatus according to claim 5, wherein
   the first housing and the second housing are formed of resin in a cylindrical shape, the first guide and the second guide are formed of metal in a cylindrical shape, and the nut is formed of resin in a shaft shape.

7. The vehicle door opening and closing apparatus according to claim 1, wherein
   the first housing and the second housing are formed of resin in a cylindrical shape, the first guide and the second guide are formed of metal in a cylindrical shape, and the nut is formed of resin in a shaft shape.

\* \* \* \* \*